April 13, 1943.  J. W. LEIGHTON  2,316,439
SPRING BOLT STRUCTURE
Filed Oct. 20, 1941
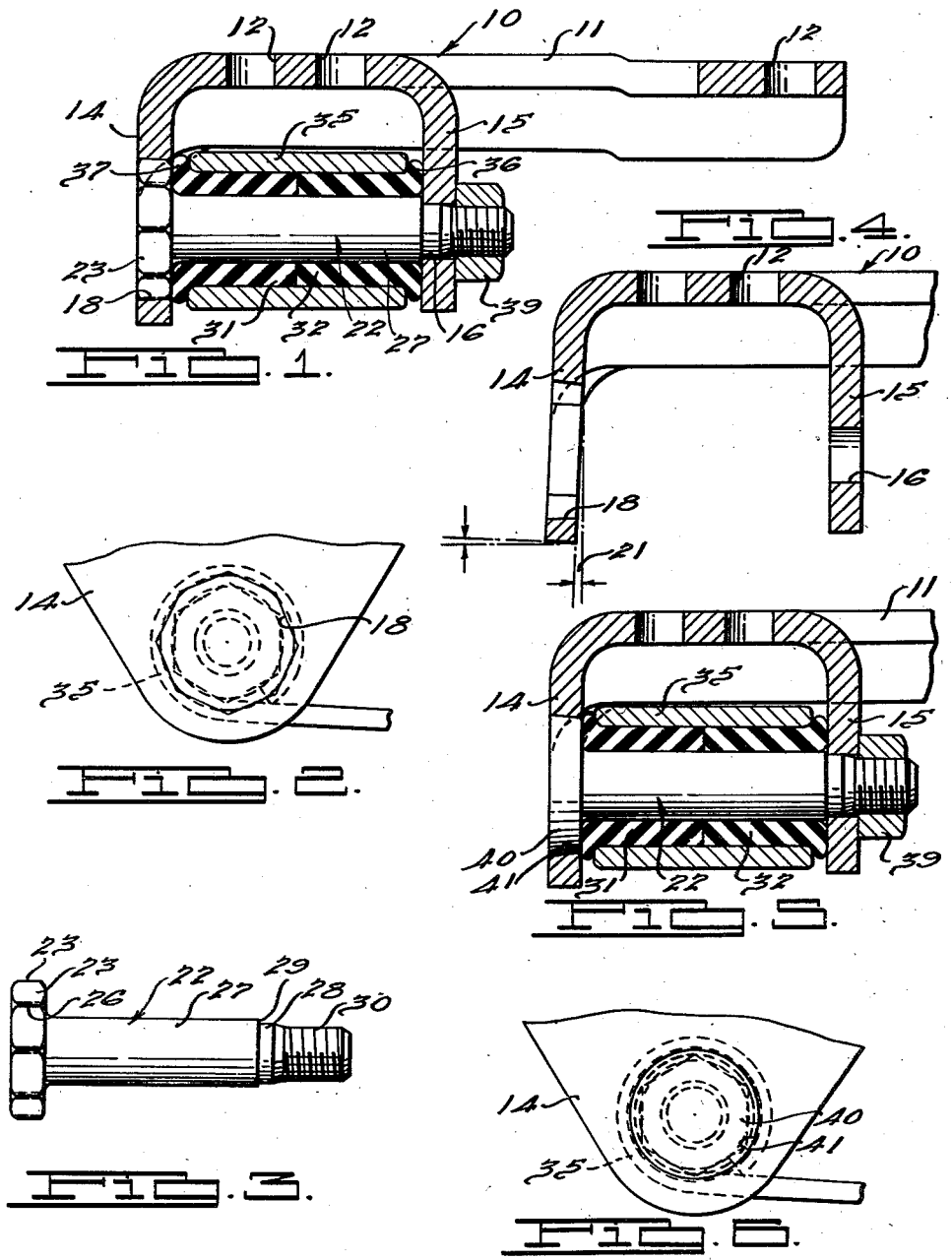
INVENTOR
John W. Leighton.
BY
Harness, Dickey & Pierce.
ATTORNEYS.

Patented Apr. 13, 1943

2,316,439

UNITED STATES PATENT OFFICE 2,316,439

SPRING BOLT STRUCTURE

John W. Leighton, Port Huron, Mich.

Application October 20, 1941, Serial No. 415,731

3 Claims. (Cl. 267—54)

The invention relates generally to motor vehicles, and it has particular relation to a shackle bolt assembly.

One object of the invention is to provide an improved shackle which can be assembled easily and which will be quieter in operation.

Another object of the invention is to provide an improved shackle structure including a rubber bushing or sleeve which can be assembled easily and wherein improved means are provided to prevent turning of the shackle bolt.

Another object of the invention is to provide an improved bolt adapted particularly for a shackle structure such as mentioned, which includes means for preventing turning and axial movement during operation of the shackle.

Another object of the invention is to provide an efficient and inexpensive method of manufacturing bolts of the type designated.

Other objects of the invention will become apparent from the following specification, from the drawing to which it relates, and from the claims hereinafter set forth.

For a better understanding of the invention, reference may be had to the drawing, wherein:

Figure 1 is a cross-sectional view illustrating a shackle bolt assembly as constructed according to one form of the invention;

Fig. 2 is a side elevational view of the structure as seen from the left side of Fig. 1;

Fig. 3 is a detail view illustrating the shackle bolt alone;

Fig. 4 is a detail view showing the shackle bracket as seen prior to the assembly of the other parts therewith;

Fig. 5 is a view on the order of Fig. 1, illustrating another form of the invention; and Fig. 6 is a side elevational view of the structure seen from the left side of Fig. 5.

Referring to Figs. 1 to 4, inclusive, a shackle bracket is indicated generally at 10, and this includes a base portion 11 adapted for fastening the bracket to the chassis frame of a motor vehicle and having openings 12 provided for this purpose. At one end, the base 11 is turned downwardly, as indicated at 14, to provide a depending leg, and in spaced relation to this leg a similar leg 15 is formed by striking out a portion of the metal in the base and bending it downwardly into substantially parallel relation to the leg 14. The leg 15 is provided with a small shackle bolt receiving opening 16, and the leg 14 is provided with a substantially larger opening 18 located in aligned relation to the opening 16. The opening 18 is octagonal in shape, as best shown by Fig. 2, and the peripheral wall defining the opening inclines to a smaller size towards the opening 16. Initially, the leg 14 is disposed in slightly out of parallel relation to the leg 15, as shown by Fig. 4, and from this it follows that when drawn into parallel relation to the leg 15, the leg 14 will resiliently tend to return to its initial position.

A shackle bolt for the assembly is indicated at 22, and this bolt has an enlarged head portion 23 of octagonal shape and having the sides thereof tapered or inclined towards the other end of the bolt as indicated. This head is adapted to fit the opening 18 in the bracket leg 14 and it will be understood that the taper or inclination of the wall 18 of the opening corresponds to the taper or inclination of the head 23 on the bolt. It might be observed that the corners or apices of the head 23 are rounded off, as indicated at 26, and the reason for this will be presently stated in connection with the manufacture of the bolt. A substantially long cylindrical body 27 is provided on the bolt and this terminates at the end opposite the head 23 in a short cylindrical portion 28 of reduced diameter. A radial shoulder 29 is provided between the portions 28 and 27 and this shoulder is adapted to engage the inner side of the leg 15 while the cylindrical portion 28 substantially fits the opening 16. Beyond the portion 28, the bolt has a still further reduced end portion 30 which is threaded.

As seen in assembled relation in Fig. 1, the body portion 27, between the legs 14 and 15 of the bracket, receives a pair of rubber bushings or sleeves 31 and 32 disposed in end to end relation and which are compressed axially between the head 23 on the bolt and the leg 15. A sleeve element 35, which in this instance constitutes a spring eye, encircles the rubber bushings and the rubber is held in axial compression within the spring eye. The spring eye is shorter than the distance between the legs 14 and 15 and the rubber bushings have radial flanges 36 and 37 at the ends of the spring eye so as to prevent any metal to metal contact between the spring eye and other parts of the structure. The compressed condition of the rubber between the spring eye and the bolt is such as to frictionally bind the metal surfaces with the rubber to such extent that any oscillatory movement of the spring eye with respect to the bolt is effected through torsioning of the rubber.

Initially, the right end bushing is inserted in the right end of the spring eye and the left end bushing is placed on the bolt. Then the bolt with the bushing thereon is inserted through the large opening 18 in the leg 14 and through the spring eye 35 and through the other bushing and the leg 15, it being understood that the rubber flange 37 is initially small enough that it can be passed through the opening 18. With the threaded end 30 of the bolt projecting from the leg 15, a nut 39 is applied thereto and upon tightening of the nut, the bolt is drawn towards the right and this compresses the two bushings between the head 23 on the bolt and the leg 15, and causes a binding engagement between the rubber, spring eye, and bolt, and enlargement of the flanges 36 and 37. This tightening of the nut is continued unitl the shoulder 29 engages the inner side of the leg 15.

During tightening of the nut 39, the head portion 23 is drawn into engagement with the tapered sides of the opening 18 in the leg 14 and after this engagement occurs, the leg 14 is flexed substantially to a position of parallelism with the leg 15. As a result, the leg 14 is resiliently held in its operable position and thus the inclined or tapered engagement between the head of the bolt and the wall of the opening 18 is constantly maintained through the strong tendency of the leg 14 to return to its initial position. As a result of this condition, no looseness is present between the head 23 and the opening 18 at any time and if the head should tend to shift slightly to the left for any reason, the resiliency of the leg 14 would cause the latter to follow the head and always maintain surface contact between the sides of the opening 18 and the sides of the head 23. Since no radial or axial looseness can occur then between the head and the opening 18 in the leg 14, quietness of operation is assured and no noise can occur by reason of any looseness between the head and opening. In addition to this, the tapered engagement and also the octagonal shape of the head and opening prevents turning of the bolt relative to the bracket. Thus, during any oscillatory movement of the spring eye relative to the bracket, the oscillatory movement is permitted through torsioning of the rubber and not through any turning of the bolt.

The structure shown by Figs. 5 and 6 is similar to that described, with the principal exception that the bolt 22 has a head portion 40 which is circular instead of octagonal. The opening in the leg 14 similarly is circular, as indicated at 41, but it is to be noted that both the head 40 and the opening 41 have inclined walls tapering towards the other end of the bolt. The bracket and other parts in this structure otherwise are the same as previously described, and it is to be understood that the leg 14 will be flexed into substantially parallel relation to the leg 15 during final assembly of the parts and tightening of the nut 39. Therefore, in this structure looseness between the head 40 and opening 41 is at all times prevented by the tapered surfaces being maintained in contact. While this structure does not have the feature of an octagonal or polygonal head disposed in a similar opening, it is to be understood that the tapered engagement of the head and opening, as strongly maintained by the resilient leg 14, will normally prevent any relative turning of the bolt and bracket. The connection between the other end of the bolt and the leg 15 will also help to hold the bolt against turning, at least to a certain extent.

It will be apparent that the bracket may be formed by sheet metal forming operations, and that the openings in the legs may be formed by punch and die mechanisms. With respect to the bolt, it is formed preferably by upsetting operations starting initially with pieces of rod or wire cut to length. The end of a piece of the rod or wire is heated sufficiently and then, by confining the major part of the piece against expansion and allowing the end to expand, an annular flange or head may be formed at the end of the piece by axial pressure on the ends of the piece so as to upset the metal. Then this flange portion is pressed axially into a die having an octagonal opening corresponding to the opening 18, so as to form the octagonal head portion 23 on the bolt. During this last operation, the metal is not completely upset into the corners of the die opening owing to the difficulty of doing this and this leaves the rounded corners 26. The head 40 on the bolt in the structure shown by Fig. 5 may be shaped similarly with the exception that the die opening will correspond to the opening 41.

From the foregoing description it, therefore, will be appreciated that quietness in the shackle operation is assured while still enabling assembly of the parts by axial insertion through the larger opening in the one bracket leg and through the spring eye. Moreover, it will be seen that looseness is prevented at all times by the spring in the leg 14 which tends to hold the head and sides of the opening in contact at all times. Additive to this, it will be observed that more positive means are provided for preventing turning of the bolt relative to the bracket and thus with the rubber bushings under compression, the oscillatory movement will be effected through torsioning of the rubber. It also will be understood that either of the structures can be manufactured inexpensively through efficient metal and bolt forming operations as described.

Although more than one form of the invention has been illustrated and described in detail, it will be apparent to those skilled in the art that various other modifications may be made without departing from the spirit of the appended claims.

What is claimed is:

1. A shackle bolt assembly comprising a bracket having spaced substantially parallel legs provided with aligned apertures, the aperture in one leg being larger than in the other and being defined by a peripheral wall inclining to smaller size towards the other opening, a sleeve element between the legs, a bolt extending through the apertures and sleeve element and having a head portion disposed in the larger portion in fitting relation to such inclined wall, and means securing the bolt to said other leg, the legs of the bracket being so formed that they tend resiliently to spread apart whereby the head portion is resiliently held in fitting relation to its aperture.

2. A shackle bolt assembly comprising a bracket having spaced substantially parallel legs provided with aligned apertures, the aperture in one leg being larger than the other, a sleeve element between the legs and which is passable through the larger aperture, a bolt extending through the apertures and sleeve, a head portion on the bolt substantially fitting the larger aperture in said one leg and including means normally preventing movement of said one leg along the head portion of the bolt in a direction away from the other leg and axially of the bolt, and means securing the bolt to said other leg, the legs of the bracket being so formed that they tend resiliently to spread apart after the bolt is in operative position.

3. A shackle bolt assembly comprising a bracket having spaced substantially parallel legs provided with apertures, the aperture in one leg being larger than the other and being polygonal in shape with the walls of the aperture tapering to smaller size towards the other leg, a sleeve element between the legs and which is passable through the larger aperture, a bolt extending through the apertures and sleeve, a polygonal head portion on the bolt substantially fitting the larger aperture in said one leg, and means securing the bolt to said other leg, the legs of the bracket being so formed that they tend to spread apart after the bolt is in operative position.

JOHN W. LEIGHTON.